US 9,207,996 B2

Dec. 8, 2015

(12) United States Patent
Ur

(10) Patent No.: US 9,207,996 B2
(45) Date of Patent: Dec. 8, 2015

(54) ACTIVE LOCK INFORMATION MAINTENANCE AND RETRIEVAL

(75) Inventor: Shmuel Ur, Shorashim (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 316 days.

(21) Appl. No.: 13/813,209

(22) PCT Filed: Aug. 1, 2012

(86) PCT No.: PCT/US2012/049163
§ 371 (c)(1),
(2), (4) Date: Jan. 30, 2013

(87) PCT Pub. No.: WO2014/021885
PCT Pub. Date: Feb. 6, 2014

(65) Prior Publication Data
US 2014/0040519 A1      Feb. 6, 2014

(51) Int. Cl.
*G06F 9/52* (2006.01)
*G06F 11/36* (2006.01)
*G06F 9/46* (2006.01)

(52) U.S. Cl.
CPC ............... *G06F 9/524* (2013.01); *G06F 9/526* (2013.01); *G06F 11/3616* (2013.01)

(58) Field of Classification Search
None
See application file for complete search history.

(56) References Cited

U.S. PATENT DOCUMENTS

| 7,093,262 | B2 | 8/2006 | Ma et al. |
| 2004/0024797 | A1 | 2/2004 | Berry et al. |
| 2005/0273782 | A1 | 12/2005 | Shpeisman et al. |
| 2006/0070076 | A1 | 3/2006 | Ma |
| 2010/0050161 | A1 | 2/2010 | Nir-Buchbinder et al. |
| 2010/0229160 | A1 | 9/2010 | Ishizaki |
| 2011/0202930 | A1 | 8/2011 | Araki |

FOREIGN PATENT DOCUMENTS

WO      PCT/US12/49163      8/2012

OTHER PUBLICATIONS

International Searching Authority, International Search Report and Written Opinion of the International Searching Authority for PCT/US12/49163, Oct. 22, 2012.
C. Artho, K. Havelund, and A. Biere; High-Level Data Races; VVEIS'03, The First International Workshop on Verification and Validation of Enterprise Information Systems; Angers, France; Apr. 22, 2003.
Stackoverflow.Com; Get Current Stack Trace in Java; website: stackoverflow.com/questions/1069066/get-current-stack-trace-in-java; correspondence thread as of Jan. 8, 2013.
Stefan Savage et al.; Eraser: A Dynamic Data Race Detector for Multithreaded Programs; ACM Transactions on Computer Systems, vol. 15, No. 4, pp. 391-411, Nov. 1997.

*Primary Examiner* — Eric C Wai
(74) *Attorney, Agent, or Firm* — Jensen & Puntigam, PS

(57) ABSTRACT

Technologies related to active lock information maintenance and retrieval are generally described. In some examples, a computing device may be configured to maintain active lock information including lock identifiers for active locks, lock access identifiers corresponding to a number of times a lock has been placed and/or released, and/or lock owner identifiers corresponding to threads placing locks. The computing device may provide an active lock information system configured to return active lock information including some or all of the lock identifiers for active locks, lock access identifiers, and/or lock owner identifiers in response to active lock information requests.

15 Claims, 4 Drawing Sheets

US 9,207,996 B2

ACTIVE LOCK INFORMATION MAINTENANCE AND RETRIEVAL

CROSS-REFERENCE TO RELATED APPLICATIONS APPLICATION

This is a U.S. National Stage Application filing under 35 U.S.C. 371 of International Application PCT/US2012/49163, entitled "ACTIVE LOCK INFORMATION MAINTENANCE AND RETRIEVAL", filed on Aug. 1, 2012, which is incorporated by reference herein in its entirety.

BACKGROUND

Unless otherwise indicated herein, the materials described in this section are not prior art to the claims in this application and are not admitted to be prior art by inclusion in this section.

In computer science, a lock is typically a synchronization mechanism for enforcing limits on access to resources in environments where there are more than one thread of execution. Locks are one way of enforcing concurrency control policies. Example locks include advisory locks, in which threads cooperate by acquiring locks before accessing corresponding resources, and releasing locks thereafter. Other example locks include mandatory locks, in which an attempt by a thread to access to a locked resource forces an exception in the thread attempting to make the access.

Some locking technologies may employ binary semaphores, in which no distinction is made between shared (read only) or exclusive (read and write) modes. Other locking technologies may employ a range of locking modes. For example, locking strategies may provide a shared mode, in which multiple threads can simultaneously acquire a shared lock for read-only access to a resource, and an exclusive mode, in which threads may acquire exclusive locks for read/write access to the resource.

Locking technologies may also employ a variety of outcomes when locks prevent progress of threads. For example, some locking technologies may block execution of threads requesting locks until corresponding resources becomes available. A "spinlock" is a lock for which threads wait ("spin") until requested locks become available to requesting threads. Other locking technologies may employ any of a range of other outcomes for requesting threads.

Locking technologies may be implemented by Operating Systems (OS), in runtime environments such as those provided by widespread JAVA® technologies, and/or in hardware and by cooperation between such entities. For example, lock instructions may be issued by threads to a supporting OS, runtime environment, and/or to hardware, and the OS, runtime environment, and/or hardware may place and release locks according to received lock instructions and according to the particular locking technologies deployed in the OS, runtime environment, and/or hardware.

Locking technology implementation is non-trivial, and lock-related problems are a widespread source of computer system malfunction, in both consumer grade and professionally managed computing systems. Some locking problems include blocking; race conditions; and deadlocks. Locking technologies also introduce complexity and scalability issues in software design.

SUMMARY

The present disclosure generally describes technologies including devices, methods, and computer readable media relating to active lock information maintenance and retrieval. Some example methods may comprise providing an active lock information system by a computing device. The active lock information system may be configured to maintain active lock information, receive active lock information requests, such as calls to an active lock information Application Programming Interface (API), and provide active lock information in response to active lock information requests. Some example methods may comprise methods for testing software using the active lock information system, comprising requesting active lock information at a beginning and end of execution of software under test to determine whether a same lock ID is associated with different lock access IDs in the end of the execution as compared to the beginning of the execution.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include a server comprising a processor, a memory, an operating system and/or a software testing system configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figures 1, 2:
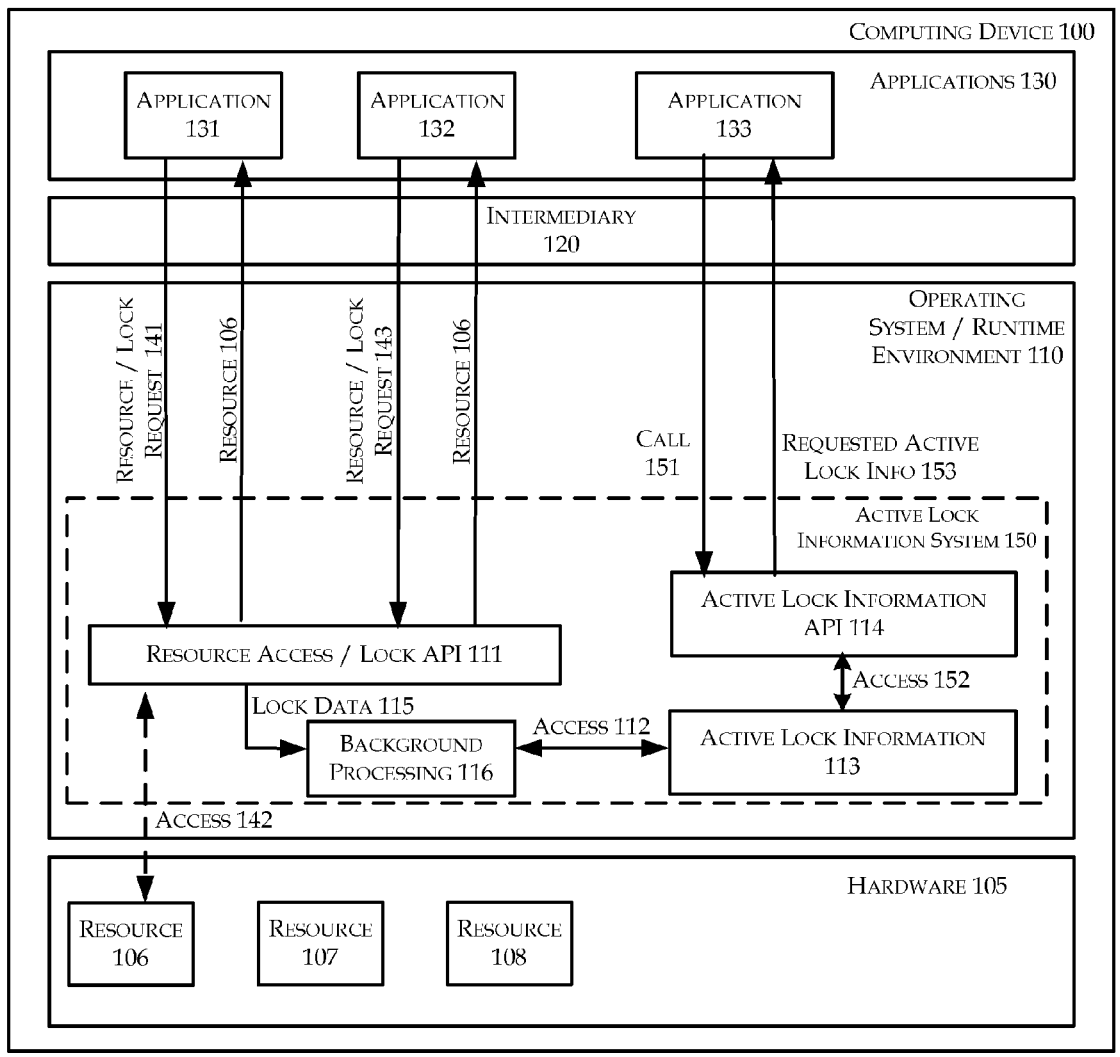
FIG. 1 is a diagram illustrating an example computing device implementing an active lock information system.
FIG. 2 illustrates an example data structure comprising active lock information.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to active lock information maintenance and retrieval. In some examples, a computing device may be configured to maintain active lock information including lock IDs for active locks, lock access IDs corresponding to a number of times a lock has been placed and/or released, and/or lock owner IDs corresponding to threads placing locks. The computing device may provide an active lock information system configured to provide active lock information including some or all of the lock IDs for active locks, lock access IDs, and/or lock owner IDs in response to active lock information requests.

In some embodiments, active lock information systems may include active lock information APIs. Active lock information APIs according to this disclosure may comprise an addition to APIs such as those provided by operating systems and/or runtime environments such as the JAVA® Thread Class API and other similar APIs. Active lock information APIs disclosed herein may be configured to return lists of lock IDs for active locks together with, for each lock, a lock access ID. The lock access ID may comprise, for example, a count of lock acquisitions, or any other variable that changes when a lock is released and re-acquired. In some embodiments, active lock information APIs disclosed herein may be configured to return lists of lock IDs for active locks placed by one or more threads.

Some example methods may comprise providing an active lock information system by a computing device. The computing device may be configured to maintain active lock information, receive active lock information requests, and provide active lock information in response to the active lock information requests.

Maintaining active lock information may include performing operations including activating lock identifiers (IDs) in maintained active lock information in response to placing, by threads managed by the computing device, locks on resources accessible by the computing device; deactivating lock IDs in maintained active lock information in response to releasing, by the threads, the locks on the resources; modifying lock access IDs in the maintained active lock information for each lock placed on the resources; and/or inserting, in the maintained active lock information, lock owner IDs corresponding to threads placing locks. Modifying lock access IDs may comprise, for example, incrementing lock version numbers in the maintained active lock information.

Active lock information requests may be configured to request at least a portion of the maintained active lock information. In some embodiments, active lock information requests may be configured to request all active locks placed by a thread, and active lock information provided in response to active lock information requests may comprise lock IDs, and optionally lock access IDs, of all active locks associated with the thread in the maintained active lock information.

In general, responses to active lock information requests may provide requested active lock information comprising lock IDs and optionally lock access IDs when lock IDs are active in the maintained active lock information. In some embodiments, active lock information may be provided to a same thread as identified by lock owner IDs in the maintained active lock information—in other words, a thread may request its own active locks and may be provided with same. In some embodiments, active lock information may be provided to a same thread as identified by lock owner IDs in the maintained active lock information—in other words, the thread may request its own active locks and may be provided with same, while the thread may not be provided with active locks held by other threads. In some embodiments, providing requested active lock information may comprise detecting a thread that generated an active lock information request and using detected thread information to look up requested active lock information in the maintained active lock information, wherein active lock information provided in response to the request comprises lock IDs and lock access IDs of all active locks associated with the detected thread—in other words, threads submitting active lock information requests may be identified by detection, rather than by, for example, self-identifying via information included in active lock information requests.

In some embodiments, methods to provide active lock information by a computing device may be performed in a runtime environment, such as runtime environments provided by JAVA® and the MICROSOFT® .NET framework, which runtime environments are configured to provide a same runtime environment within the computing device as within other computing devices comprising the runtime environment and different device hardware. That is, a JAVA® or similar runtime environment may be configured to provide an active lock information system. In some embodiments, methods to provide an active lock information system may be performed in an operating system configured to support software testing. For example, an operating system from the WINDOWS® and/or WINDOWS® MOBILE family of operating systems, from the MAC OS® and/or iOS family of operating systems, and/or from the ANDROID® family of operating systems, or other operating system may be configured to support software testing by providing the active lock information system.

Some example methods may comprise methods to test software using the active lock information system, comprising requesting active lock information at a beginning and end of execution of software under test, to determine whether a same lock ID is associated with different lock access IDs in the end of the execution as compared to the beginning of the execution. Such methods may be used for example to determine whether locks are held by a computing device as expected by designers of the software under test. If a lock is released and replaced during execution of the software under test, the lock ID may be associated with different lock access IDs in the end of the execution compared to the beginning of the execution. Lock access IDs can be gathered using the active lock information API, and used to understand and improve operation of the software under test and/or operation of the computing device.

For example, methods for testing software may comprise producing, by a software testing system within a computing device, a first active lock information request configured to request first active lock information; receiving, by the software testing system in response to the first active lock information request, first active lock information comprising lock IDs and lock access IDs of initially active locks placed on resources accessible by the computing device; executing software under test within the computing device; producing, by the software testing system, a subsequent active lock information request configured to request subsequent active lock information; receiving, by the software testing system in response to the subsequent active lock information request, subsequent active lock information comprising lock IDs and lock access IDs of subsequently active locks; and/or comparing, by the software testing system, the first active lock information and the subsequent active lock information to determine whether a same lock ID is associated with different lock access IDs in the first and the subsequent active lock information.

In some embodiments, the software testing system may compare the first active lock information and the subsequent active lock information to verify that locks placed during execution of the software under test are placed according to a desired synchronization protocol. In some embodiments, the software testing system may compare the first active lock information and the subsequent active lock information to ensure atomicity of a sequence of accesses to one or more of the resources.

The software under test may comprise any software. In some embodiments, the software under test may comprise a database driver, and resources accessible by the computing device and subject to locks placed by the database driver may comprise portions of a database. In other embodiments, the software under test may comprise any software that interacts with the database driver. In other embodiments, the software under test may comprise any application or other software and the resources may comprise any file or other computing resource.

FIG. 1 is a diagram illustrating an example computing device implementing an active lock information system, arranged in accordance with at least some embodiments of the present disclosure. FIG. 1 includes a computing device 100, comprising hardware 105, an operating system or a runtime environment 110 (referred to herein as operating system 110), an intermediary 120, and applications 130. Hardware 105 comprises a resource 106, a resource 107, and a resource 108, as examples of resources accessible by hardware 105. Three resources are shown in FIG. 1 for simplicity and one skilled in the art will be appreciate that a different number of resources (usually many more than three) may be accessible by hardware 105. Operating system 110 comprises an active lock information system 150. Active lock information system 150 comprises a resource access/lock API 111, background processing 116, active lock information 113, and an active lock information API 114. Applications 130 include an application 131, an application 132, and an application 133. Three applications are shown in FIG. 1 for simplicity and one skilled in the art will be appreciate that computing device 100 may comprise a different number of applications.

In FIG. 1, operating system 110, intermediary 120, and applications 130 may execute on hardware 105. Operating system 110 may have direct control of hardware 105 and may manage execution of applications 130 on hardware 105, including managing access to resources 106, 107, 108 by applications 130, and any corresponding locks on resources 106, 107, 108. In some embodiments, intermediary 120 may comprise a guest operating system or runtime environment, and operating system 110 may comprise a hypervisor or host operating system. It will be appreciated that some or all of the components described herein in connection with operating system 110 may be provided by intermediary 120, and also that, in some cases, the presence of intermediary 120 may lead to locking problems in which, for example, application 131 acquires a lock on resource 106, which lock is then released and then re-acquired due to operations of intermediary 120 and/or operating system 110, without notice to application 131 and resulting in non-atomic, rather than atomic, transactions by application 131, when application 131 is designed or intended to perform atomic transactions.

When applications such as applications 131, 132, and/or 133 are loaded by operating system 110 to execute on device 100, threads corresponding to applications 131, 132, and/or 133 are executed by hardware 105. Actions by applications 131, 132, and/or 133 may comprise actions by corresponding threads. Hardware 105 may comprise both hardware involved in executing applications 131, 132, and/or 133 as well as any other hardware, such as memory locations which may or may not be directly involved in ordinary processing activities.

Any of applications 131-133 may be configured to make resource/lock requests to resource access/lock API 111, which requests may be, in some cases, via intermediary 120. For example, application 131 may be configured to make a resource/lock request 141 to resource access/lock API 111, and application 132 may be configured to make a resource/lock request 143 to resource access/lock API 111.

Resource access/lock API 111 may be configured to access resources accessible by computing device 100 in response to received resource/lock requests. For example, resource access/lock API 111 may be configured to perform a resource access 142 to access resource 106 in response to resource/lock request 141. Resource access/lock API 111 may be configured to provide resource 106 to application 131 for example by loading resource 106 into a memory location accessible by application 131, and by providing to application 131 a pointer to the memory location, or otherwise returning any information or data to application 131 which allows application 131 to access resource 106.

Resource access/lock API 111 and/or background processing 116 may be configured to place and release locks on any resources in computing device 100 in response to received resource/lock requests. For example, when resource/lock request 141 comprises a request to place a lock on resource 106, resource access/lock API 111 and/or background processing 116 may be configured to place the lock on resource 106 in response to resource/lock request 141. When resource/lock request 141 comprises a request to release the lock on resource 106, resource access/lock API 111 and/or background processing 116 may be configured to release the lock on resource 106 in response to resource/lock request 141.

In some embodiments, resource access/lock API 111 may be configured to place and/or release locks by providing lock data 115 to background processing 116. In some embodiments, resource access/lock API 111 may be configured to otherwise place and/or release locks, and to separately provide lock data 115 to background processing 116. Background processing 116 may be configured, inter alia, to perform access 112 to maintain active lock information 113. Active lock information 113 may comprise a table or other data structure such as illustrated in FIG. 2.

FIG. 2 illustrates an example data structure comprising active lock information, arranged in accordance with at least some embodiments of the present disclosure. As depicted, active lock information 113 comprises a table organized with rows and columns. A first row includes a lock ID 201 in a first column, a lock access ID 211 in a second column, and a lock owner ID 221 in a third column. A second row includes a lock ID 202 in the first column, a lock access ID 212 in the second column, and a lock owner ID 222 in the third column. A third row includes a lock ID 203 in the first column, a lock access ID 213 in the second column, and a lock owner ID 223 in the third column. It will be appreciated that data structures may be organized in a wide variety of ways to achieve the purposes associated with FIG. 2, and this disclosure is not limited to any particular data structure format or arrangement. Also, three lock IDs and corresponding lock access IDs and lock owner IDs are shown in FIG. 2 for simplicity and one skilled in the art will be appreciate that active lock information 113 may comprise a different number of lock IDs, lock access IDs, and lock owner IDs, and in some embodiments active lock information 113 may comprise a variable number of lock IDs, lock access IDs, and lock owner IDs.

Background processing 116 may be configured to activate lock IDs in maintained active lock information 113 in response to placing, by threads managed by computing device 100 corresponding to applications 130, locks on resources accessible by the computing device 100. For example, background processing 116 may be configured to activate lock ID 201 for resource 106 in maintained active lock information 113 in response to placing, by a thread corresponding to application 131, a lock on resource 106 or otherwise in response to placing the lock on resource 106 by operating system 110.

Conversely, background processing 116 may be configured to deactivate lock IDs in maintained active lock information 113 in response to releasing, by threads managed by computing device 100 corresponding to applications 130, locks on resources accessible by the computing device 100. For example, background processing 116 may be configured to deactivate lock ID 201 for resource 106 in maintained active lock information 113 in response to releasing, by the thread corresponding to application 131, the lock on resource 106 or otherwise in response to releasing the lock on resource 106 by operating system 110.

In some embodiments, background processing 116 may be configured to activate and deactivate lock IDs in maintained active lock information 113 by adding and deleting lock IDs in maintained active lock information 113, e.g., by adding or deleting a row from a table such as illustrated in FIG. 2. In some embodiments, resource access/lock API 111 may be configured to activate and deactivate lock IDs for example by adding an "activated" or "deactivated" flag in active lock information 113, e.g., in an additional column (not shown) included in the table illustrated in FIG. 2. In some embodiments, lock IDs may comprise resource IDs. Lock IDs may alternatively or in addition comprise, for example, IDs of memory locations in which locked resources are stored, or any other information enabling accurate identification of resources that are locked.

In some embodiments, background processing 116 may be configured to modify lock access IDs in maintained active lock information 113 for each lock placed on resources. For example, when application 131 places a lock on resource 106, background processing 116 may be configured to write lock access ID 211 in FIG. 2, in addition to activating lock ID 201.

Lock access ID 211 may comprise any variable that changes each time a new lock is placed on a resource. For example, in some embodiments, lock access ID 211 in maintained active lock information 113 may comprise a lock version number that is incremented for each lock instance, that is, for each time a lock is released and re-acquired. In such embodiments, when resource 106 is first locked by application 131, lock ID 201 may be activated and lock access ID 211 may be set to 1. When the lock on resource 106 is subsequently released by application 131 and subsequently locked, e.g., by application 132 or subsequently re-locked by application 131, or by any other application, lock access ID 211 may be set to 2. Subsequent locks on resource 106 may be assigned subsequent lock access IDs, such as 3, 4, 5, etc.

In some embodiments, an appropriately accurate system time, e.g., a system time in microseconds corresponding to a time when a lock is placed, may be used as a lock access ID. A wide variety of other variables may be used for lock access IDs, and this disclosure is not limited to any particular choice of variable.

In some embodiments, background processing 116 may be configured to insert, in maintained active lock information 113, lock owner IDs corresponding to threads placing locks.

For example, when application 131 places a lock on resource 106, background processing 116 may be configured to write lock owner ID 221 in FIG. 2, in addition to activating lock ID 201, where lock owner ID 221 is the thread for application 131 holding the lock. Lock owner IDs may comprise any of a variety of different types of identifiers and combinations thereof. For example, lock owner IDs may comprise one or more of thread identifiers, process identifiers, and/or time identifiers corresponding to a time when a lock was placed, and combinations thereof.

Active lock information API 114 may be configured to receive active lock information requests in the form of API calls and provide requested active lock information in response to received API calls. For example, in FIG. 1, application 133 makes API call 151. Active lock information API 114 may be configured to receive API call 151, and to perform access 152 to active lock information 113 to retrieve active lock information requested by API call 151. Active lock information API 114 may be configured to provide requested active lock information 153 to application 133 in response to received API call 151.

In some embodiments, active lock information API 114 may be configured to provide any requested active lock information 153. For example, API call 151 may request all active locks, and active lock information API 114 may be configured to provide, in response, requested active lock information 153 comprising all active lock IDs in active lock information 113. Active lock information API 114 may optionally furthermore provide lock access IDs and lock owner IDs corresponding to active lock IDs.

In some embodiments, API call 151 may request any subset(s) of active locks, and active lock information API 114 may be configured to provide, in response, requested active lock information 153 comprising requested subset(s) of lock IDs from active lock information 113. For example, API call 151 may request active locks associated with a resource, such as resource 106. Active lock information API 114 may be configured to provide, in response, requested active lock information 153 associated with resource 106. Requested active lock information 153 associated with resource 106 may comprise, e.g., lock ID 201, and optionally also lock access ID 211 and/or lock owner ID 221. In some embodiments, active lock information API 114 may be configured to perform a lookup and/or algorithmic modification of a resource identifier in API call 151, to produce a lock ID that can be successfully located in active lock information 113.

In some embodiments, when multiple locking modes are employed by resource access/lock API 111, resource 106 may be associated with multiple lock IDs in active lock information 113, where each lock ID contains information identifying an applicable locking mode. API call 151 may request lock IDs associated with all locks on resource 106, or may request lock IDs associated with a subset of locks on resource 106, such as the locks corresponding to an identified locking mode. Active lock information API 114 may be configured to return lock IDs associated with all locks on resource 106 and/or to return lock IDs associated with locking modes specified in API call 151.

In some embodiments, API call 151 may request active locks associated with one or more threads. For example, API call 151 may request active locks associated with a thread corresponding to application 131. Active lock information API 114 may be configured to provide, in response, requested active lock information 153 associated with application/ thread 131. Active lock information API 114 may be configured to lookup application/thread 131 among lock owner IDs in active lock information 113, and to return all or a subset of lock IDs, optionally along with corresponding lock access IDs, associated with application/thread 131 in active lock information 113. Requested active lock information 153 associated with application/thread 131 may comprise, e.g., lock ID 201, and optionally also lock access ID 211 and/or lock owner ID 221. In some embodiments, active lock information API 114 may be configured to perform a lookup and/or algorithmic modification of an application or lock owner ID in API call 151, to produce a lock owner ID that can be successfully located in active lock information 113.

In some embodiments, active lock information API 114 may be configured to support a variety of security and convenience features involving providing requested active lock information 153 associated with threads. For example, in some embodiments, active lock information API 114 may be configured to provide requested active lock information 153 to a same thread as identified by a lock owner ID in API call 151. In other words, active lock information API 114 may be configured to allow threads to request their own active lock information, but not active lock information for other threads. Active lock information API 114 may be configured to compare a lock owner ID for application 133 with any lock owner IDs in API call 151. When compared lock owner IDs match, active lock information API 114 may be configured to provide requested active lock information 153 for the matching lock owner IDs. Requested active lock information 153 may exclude active lock information 113 for any lock owner IDs in API call 151 which do not match lock owner IDs for application 133.

In some embodiments, providing requested active lock information 153 by active lock information API 114 may comprise detecting a thread, e.g., a thread associated with application 133, that generated API call 151, and using detected thread information to look up requested active lock information 153 in maintained active lock information 113, wherein requested active lock information 153 provided in response to API call 151 comprises lock IDs and lock access IDs of all active locks associated with detected thread information in maintained active lock information 113. Such embodiments provide convenience in that application 133 need not identify itself in order to request its active lock information. Such embodiments may also provide security in that application 133 may not request active lock information for threads other than itself, such as threads for application 131 and 132. Active lock information API 114 may be configured to detect application/thread 133 that generated API call 151 for example by referring to active thread information available from operating system 110.

In some embodiments, active lock information system 150 may be configured to provide active lock information 113 by means other than active lock information API 114. For example, in some embodiments, active lock information system 150 may be configured to maintain active lock information 113 in a file, such as a log file, in a location that is accessible by applications 131-133, such as any local or network storage location. Applications 131-133 may obtain desired active lock information by accessing the local or network storage location in which active lock information 113 is stored. In some embodiments, active lock information system 150 may be configured to provide some or all of active lock information 113 directly into a memory associated with an application. For example, active lock information system 150 may be configured to provide an active lock information service configured to place active lock information 113 associated with a particular thread in a thread context memory space. It will be appreciated by those of skill in the art that there are many ways to make information available to applications 130 and that a variety of workable solutions may be available for particular embodiments.

In some embodiments, active lock information system 150 may be employed in operating systems configured to support software testing. For example, operating system 110 may include a variety of features enabling test operation and diagnostics of applications 131, 132, and such features may include active lock information system 150.

In some embodiments, application 133 may comprise a software testing system configured to cause applications 131, 132 to execute on device 100, while performing certain automated testing routines to determine bugs and vulnerabilities in applications 131, 132. Testing routines employed by application 133 may be configured to use active lock information system 150. For example, application 133 may be configured to produce a first active lock information API call configured to request first active lock information, and to receive in response to the first active lock information API call, first active lock information comprising lock IDs and lock access IDs of initially active locks placed on resources 106, 107, 108. Application 133 may be configured to proceed to execute software under test, such as application 131 or a section thereof, within the computing device 100. Application 133 may be configured to next produce a subsequent active lock information API call configured to request subsequent active lock information, and to receive in response to the subsequent active lock information API call, subsequent active lock information comprising lock IDs and lock access IDs of subsequently active locks. Application 133 may be configured to compare the first active lock information and the subsequent active lock information to determine whether a same lock ID is associated with different lock access IDs in the first and the subsequent active lock information.

When a same lock ID is associated with different lock access IDs in the first and the subsequent active lock information, application 133 may be configured to infer that a corresponding lock was released and then taken again during execution of application 131. This may indicate a bug or other problem to be resolved, e.g., when application 131 is designed to hold the corresponding lock without releasing it. Application 133 may be configured to compare the first active lock information and the subsequent active lock information to ensure atomicity of a sequence of accesses to one or more of resources 106 to ensure that lock IDs are not associated with different lock access IDs in a manner that other than expected for the sequence of accesses. In some embodiments, application 133 may be configured to compare the first active lock information and the subsequent active lock information to verify that locks placed during execution of the software under test are placed according to a desired synchronization protocol.

Active lock information APIs according to this disclosure may be used in a wide variety of possible ways. Several example uses are described herein. In some examples, active lock information APIs may be used to validate protection of resources, in the form of appropriate locks on the resources, which resources may be accessed by software under test. For example, a software tester may wish to know if a method is protected by a lock. A software testing system may be configured to request active lock information at a beginning and an end of execution of a section of software under test. Lock information returned from multiple active lock information requests may be compared to determine if the section is atomic. For example, when there is a lock that is taken in the beginning and the end of the section, with a same lock access ID indicating that the lock was not released and retaken, the section may possibly be atomic. Conversely, when lock access IDs are different in the beginning and the end of the section, it may be inferred that the lock was released and retaken, and the section may not be atomic.

In some examples, the software tester may wish to know if an object which is not part of software under test but is accessed by the software under test is protected by a lock. The software testing system may be configured to use a lockset algorithm, and to request active lock information as part of the lockset algorithm to determine which locks are held the when object is accessed. Active lock information system 150 may allow third-party components and tools to verify that they are used according to desired synchronization protocols, including checking for complex conditions such as atomicity of sequences of operations. In some examples, the software tester may wish to know if a contract (protection by locks) is observed. The software testing system may be configured to request active lock information and calculate lockset while executing the software under test.

Lockset and eraser algorithms attempt to determine locks that protect computing resources, such as variables and other objects. Example algorithms may compute, on every access to a resource, an intersection of a set of locks currently held with previous locks held. If the intersection becomes an empty set, there may be no lock that always protects the resource.

For example, the below pseudo code provides an example lockset algorithm:
Let locks held (t) be the set of locks held by thread t.
For each variable v, initialize function C (v) to the set of all locks on v.
On each access to v by thread t:
set C (v)=C (v) Union locks held (t);
if C (v)=empty set { }, then issue a warning.

In some embodiments, active lock information system 150 may be employed alongside algorithms such as the above example lockset algorithm. The above example lockset algorithm assumes knowledge of when variable v is accessed, and allows determinations of whether locks protect variable v. However, without active lock information system 150, the above and other similar algorithms may not work without knowledge of when variable v (or other resource) is accessed. For example, if the resource is an object representing a database, software accessing the object may not have access to information delineating which table and which row in the database is accessed by a particular statement. As a result, without active lock information system 150, determinations of whether locks are actively protecting resources using the above example lockset algorithm may be difficult or impossible in certain situations. Active lock information system 150 may be used to gather information useful in making determinations of whether locks are actively protecting resources.

Additional example uses of active lock information system 150 may for example ensure atomicity of sequences of accesses to resources. For example, to ensure proper operation some software may access certain resources atomically. As part of testing such software, a software testing system may be configured to use active lock information system 150 to validate that accesses to the resource are atomic or otherwise according to acceptable synchronization protocols.

In some examples, software (which is not necessarily under test) may be configured to access a resource comprising, for example, an object representing a database. As noted in the background section, the software accessing the object may not have access to information delineating which table and which row in the database is accessed by a particular statement. However, a database driver, or a third-party tool, may be configured to analyze statements within the software, request active lock information to identify active locks, and compare the statements with active lock information returned by active lock information system 150 to ensure accesses to the object are correctly protected using locks.

Figure 3:
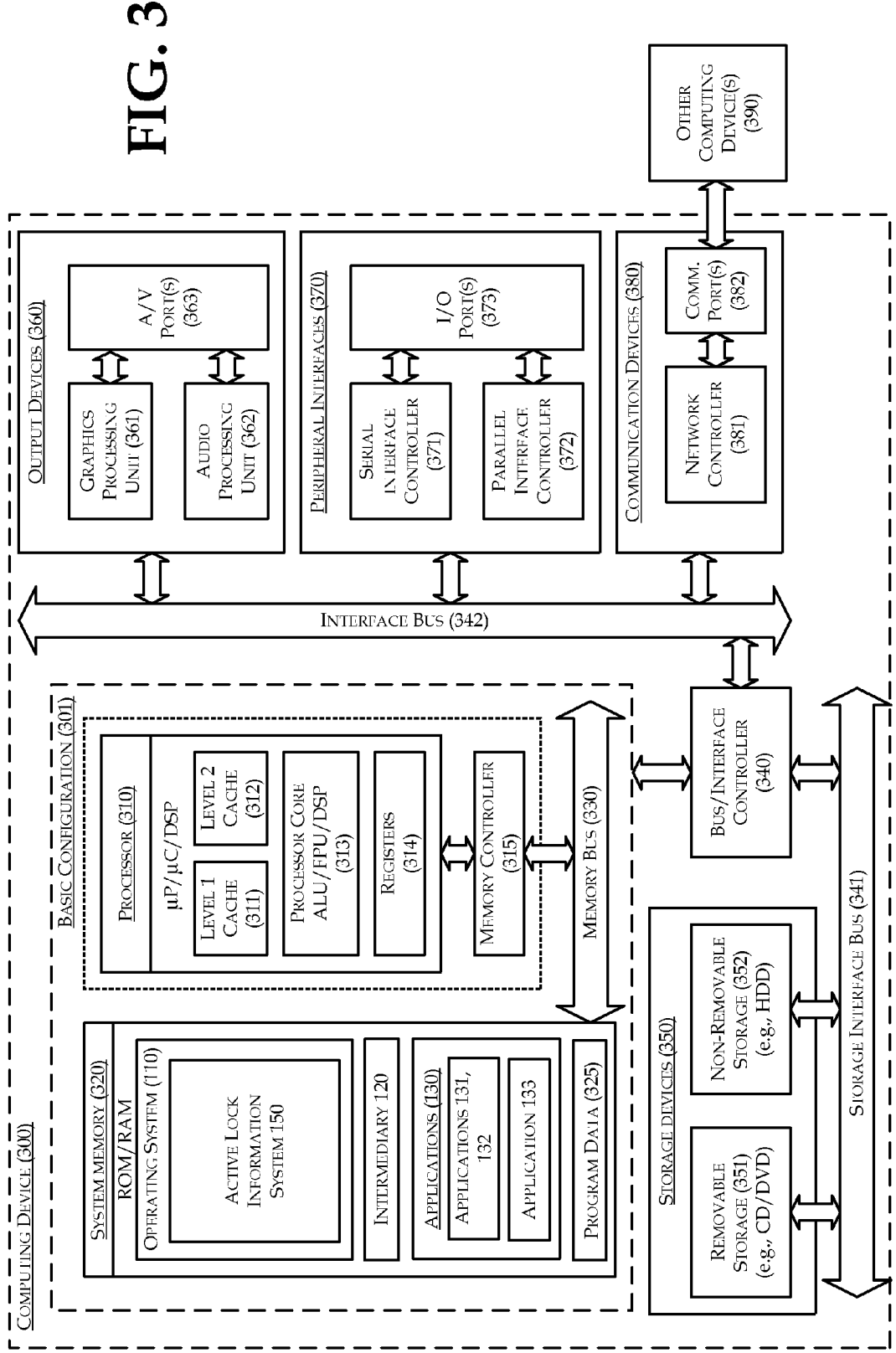
FIG. 3 is a block diagram of an example computing device configured to provide an active lock information system.

FIG. 3 is a block diagram of an example computing device 300 configured to provide an active lock information system, arranged in accordance with at least some embodiments of the present disclosure. In a very basic configuration 301, computing device 300 may include one or more processors 310 and system memory 320. A memory bus 330 may be used for communicating between the processor 310 and the system memory 320.

Depending on the desired configuration, processor 310 may be of any type including but not limited to a microprocessor (µP), a microcontroller (µC), a digital signal processor (DSP), or any combination thereof. Processor 310 may include one or more levels of caching, such as a level one cache 311, level two cache 312, a processor core 313, and registers 314. The processor core 313 may include an arithmetic logic unit (ALU), a floating point unit (FPU), a digital signal processing core (DSP Core), or any combination thereof. A memory controller 315 may also be used with the processor 310, or in some implementations the memory controller 315 may be an internal part of the processor 310.

Depending on the desired configuration, the system memory 320 may be of any type including but not limited to volatile memory (such as RAM), non-volatile memory (such as ROM, flash memory, etc.), or any combination thereof. System memory 320 may include operating system 110, intermediary 120, one or more applications 130, and program data 325. In some embodiments, operating system 110 may comprise a virtual machine that is managed by a Virtual Machine Manager (VMM). In some embodiments, an intermediary 120 may comprise a runtime environment or guest operating system configured to operate in cooperation with operating system 110. Operating system 110 and/or intermediary 120 may include, for example, active lock information system 150. Applications 130 may include may include applications 131, 132, and/or 133. In some embodiments, applications 131 may include software under test, while application 133 may comprise a software testing system. Applications 130 may use program data 325 when executing on computing device 300.

Computing device 300 may have additional features or functionality, and additional interfaces to facilitate communications between the basic configuration 301 and any required devices and interfaces. For example, a bus/interface controller 340 may be used to facilitate communications between the basic configuration 301 and one or more data storage devices 350 via a storage interface bus 341. The data storage devices 350 may be removable storage devices 351, non-removable storage devices 352, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 311, Level 2 cache 312, system memory 320, removable storage 351, and non-removable storage 352 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store desired information, such as resources 106, 107, and 108 that may be accessed by computing device 300. Any such computer storage media may be part of device 300.

Computing device 300 may also include an interface bus 342 for facilitating communication from various interface devices (e.g., output interfaces, peripheral interfaces, and communication interfaces) to the basic configuration 301 via the bus/interface controller 340. Example output devices 360 include a graphics processing unit 361 and an audio processing unit 362, which may be configured to communicate to various external devices such as a display or speakers via one or more A/V ports 363. Example peripheral interfaces 370 may include a serial interface controller 371 or a parallel interface controller 372, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 373. Other conventional I/O devices may be connected as well such as a mouse, keyboard, and so forth. An example communications device 380 includes a network controller 381, which may be arranged to facilitate communications with one or more other computing devices 390 over a network communication via one or more communication ports 382.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 300 may also be implemented as a personal or business use computer including both laptop computer and non-laptop computer configurations. Computing device 300 may be implemented as a mobile device such as a smart phone or a special purpose device such as a vehicle computer.

Figure 4:
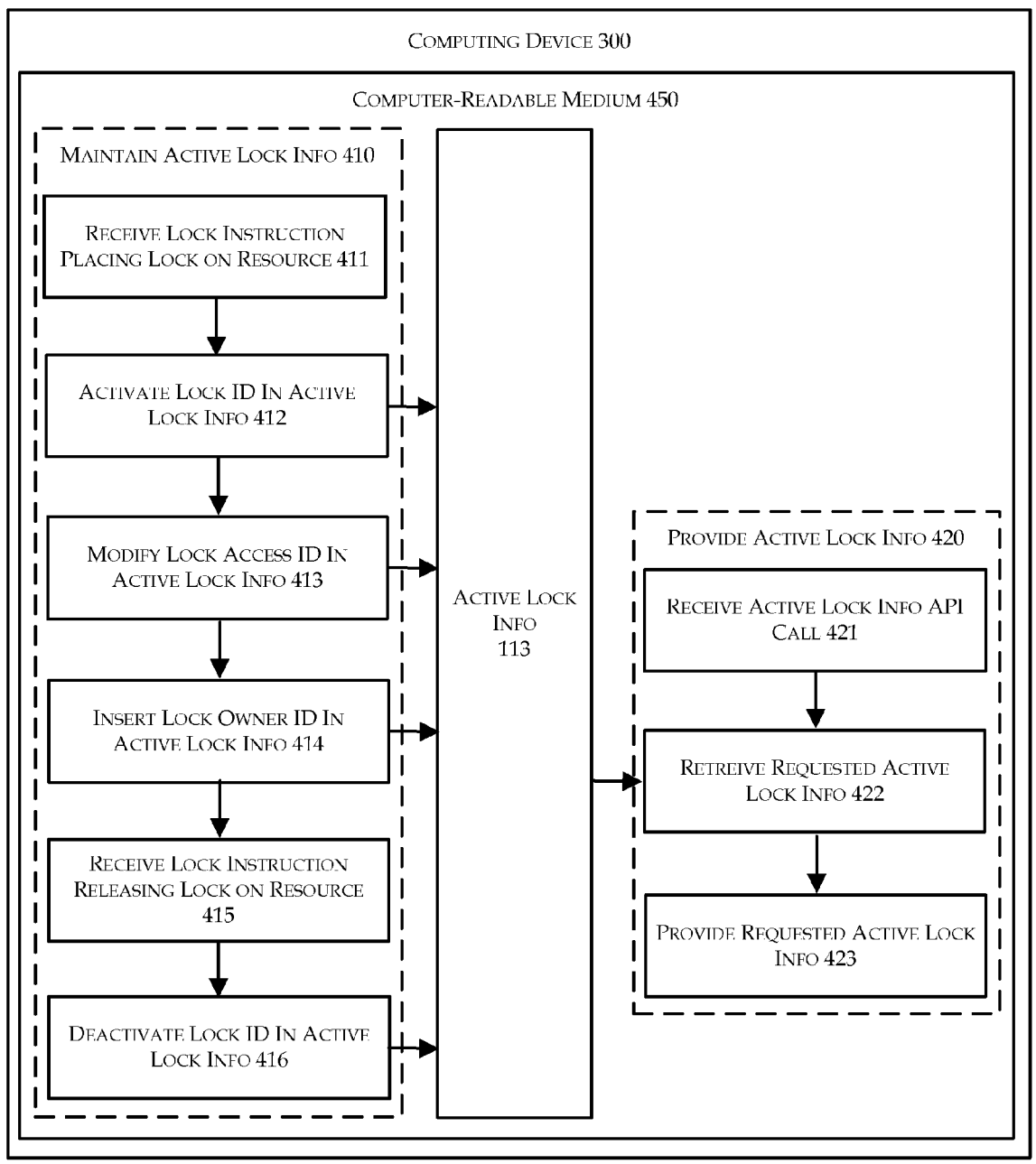
FIG. 4 is a flow diagram illustrating an example method configured to provide an active lock information system.

FIG. 4 is a flow diagram illustrating an example method configured to provide an active lock information system, arranged in accordance with at least some embodiments of the present disclosure. The example flow diagram may include one or more operations/modules as illustrated by blocks in a "Maintain Active Lock Info" group 410, comprising blocks 411-416, and blocks in a "Provide Active Lock Info" group 420, comprising blocks 421-423. Blocks of groups 410 and 420 interact with active lock information 113. Blocks 411-416 and 421-423 represent operations as may be performed in a method, functional modules in a computing device 300, and/or instructions as may be recorded on a computer readable medium 450. The illustrated blocks 411-416 may be arranged to provide functional operations of "Receive Lock Instruction Placing Lock on Resource" at block 411, "Activate Lock ID in Active Lock Info" at block 412, "Modify Lock Access ID in Active Lock Info" at block 413, "Insert Lock Owner ID in Active Lock Info" at block 414, "Receive Lock Instruction Releasing Lock on Resource" at block 415, and/or "Deactivate Lock ID in Active Lock Info" at block 416. The illustrated blocks 421-423 may be arranged to provide functional operations of "Receive Active Lock Info API Call" at block 421, "Retrieve Requested Active Lock Info" at block 422, and/or "Provide Requested Active Lock Info" at block 423.

In FIG. 4, blocks 411-416 and 421-423 are illustrated as including blocks being performed sequentially, e.g., with block 411 first and block 416 last in group 410, and with block 421 first and block 423 last in group 420. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 4 illustrates an example method by which computing device 300 configured with active lock information system 150 may maintain active lock information 113 and provide requested active lock information in response to requests by applications 131, 132, and/or 133 to active lock information system 150. Active lock information system 150 in computing device 300 may maintain active lock information 113 by activating and deactivating lock IDs therein as locks are placed and released, and by inserting additional lock information such as lock access IDs and lock owner IDs. Active lock information system 150 in computing device 300 may provide requested active lock information by receiving active lock information API calls, retrieving requested active lock information from active lock information 113, and providing requested active lock information in response to received API calls.

The blocks of "Maintain Active Lock Info" group 410 may be performed, for example, by background processing 116, described in connection with FIG. 1. In a "Receive Lock Instruction Placing Lock on Resource" block 411, active lock information system 150 in computing device 300 may receive a lock instruction from a thread. The received lock instruction may request a lock on a resource accessible by the operating system. When the lock is available, the operating system may deploy any of a variety of locking technologies to place the requested lock on the resource. When the lock is not available, active lock information system 150 may deploy any of a variety of locking technologies to support cooperation with other threads, e.g., "spinning" the requesting thread, until the lock becomes available, and the operating system may then place the requested lock. Depending on locking technology deployed, the operating system may notify the requesting thread when it holds the requested lock. Block 411 may be followed by block 412.

In an "Activate Lock ID in Active Lock Info" block 412, in response to placing the requested lock pursuant to block 411, active lock information system 150 in computing device 300 may write a lock ID, or otherwise activate the lock ID corresponding to the requested lock, in active lock information 113. Block 412 may be followed by block 413.

In a "Modify Lock Access ID in Active Lock Info" block 413, active lock information system 150 in computing device 300 may write a lock access ID along with the lock ID in active lock information 113. Example lock access IDs may comprise lock version numbers. The operating system may determine a new lock access ID for example by incrementing a previous lock access ID by one. The new lock access ID may be written into active lock information 113. Block 413 may be followed by block 414.

In an "Insert Lock Owner ID in Active Lock Info" block 414, active lock information system 150 in computing device 300 may write a lock owner ID along with the lock ID in active lock information 113. The lock owner ID may correspond to a thread for which the lock is placed. The lock owner ID may be known to the operating system as corresponding to a currently executing thread in computing device 300. Otherwise, the lock owner ID may be included in the received lock instruction, and active lock information system 150 may gather lock owner ID information from the received lock instruction and write gathered lock owner ID information into active lock information 113. Block 414 may be followed by block 415.

In a "Receive Lock Instruction Releasing Lock on Resource" block 415, active lock information system 150 in computing device 300 may receive a lock instruction from a thread. The received lock instruction may release the lock on the resource. Depending on locking technology deployed, active lock information system 150 may notify the thread when the lock is released. Block 415 may be followed by block 416.

In a "Deactivate Lock ID in Active Lock Info" block 416, in response to releasing the requested lock pursuant to block 415, active lock information system 150 in computing device 300 may delete a lock ID, or otherwise deactivate the lock ID corresponding to the released lock, in active lock information 113. Some embodiments may omit block 416, and instead employ block 412 to overwrite lock IDs and corresponding lock access IDs and/or lock owner IDs in active lock information 113. In some embodiments, when a lock is released and immediately re-acquired by a same or different thread, the lock ID may remain active, while corresponding lock access ID and lock owner ID information may be updated as described herein. Block 412 may be followed by block 413.

The blocks of "Provide Active Lock Info" group 420 may be performed, for example, by active lock information API 114, described in connection with FIG. 1. In a "Receive Active Lock Info API Call" block 421, active lock information system 150 in computing device 300 may receive active lock information API call from a thread. The received API call may request any portion, up to and including all of maintained active lock information 113. In some examples, the received API call may request all active locks associated with one or more particular threads. In some examples, the received API call may any active lock information associated with one or more particular resources. In some examples, the received API call may or may not explicitly request active locks associated with one or more particular threads, however active lock information system 150 may detect the thread that generated the API call, and use detected thread information to look up the requested active lock information in the maintained active lock information. In such embodiments, active lock information API calls may be treated as implicitly requesting active lock information for threads making the API calls. Block 421 may be followed by block 422.

In a "Retrieve Requested Active Lock Info" block 422, active lock information system 150 in computing device 300 may retrieve requested active lock information from active lock information 113. Active lock information system 150 may for example perform one or more lookup operations, to look up information in active lock information 113, based on information received in and/or detected from active lock information API calls. Block 422 may be followed by block 423.

In a "Provide Requested Active Lock Info" block 423, active lock information system 150 in computing device 300 may provide, in response to the active lock information API call received in block 421, requested active lock information. The provided active lock information may comprise, e.g., lock IDs for active locks in maintained active lock information 113, retrieved pursuant to block 422. The provided active lock information may further comprise lock access IDs and/or lock owner IDs corresponding to the provided lock IDs.

In some examples, requested active lock information provided in response to active lock information API calls may comprise any portion, up to and including all of maintained active lock information 113. For example, provided active lock information may include lock IDs and lock access IDs of all active locks associated with one or more lock owner IDs in the maintained active lock information 113. Provided active lock information may include lock IDs and lock access IDs of associated with one or more computing resources in the maintained active lock information 113. Association with a resource may be determined, in some embodiments, from information included in lock IDs. In some examples, active lock information may be provided to same threads as identified by lock owner IDs in active lock information 113. For example, active lock information associated with a "thread A" in active lock information 113 may be provided to thread A in response to API calls from thread A, active lock information associated with a "thread B" in active lock information 113 may be provided to thread B, and so on, while active lock information associated with a "thread B" in active lock information 113 may optionally not be provided to thread A or any threads other than thread B.

Figure 5:
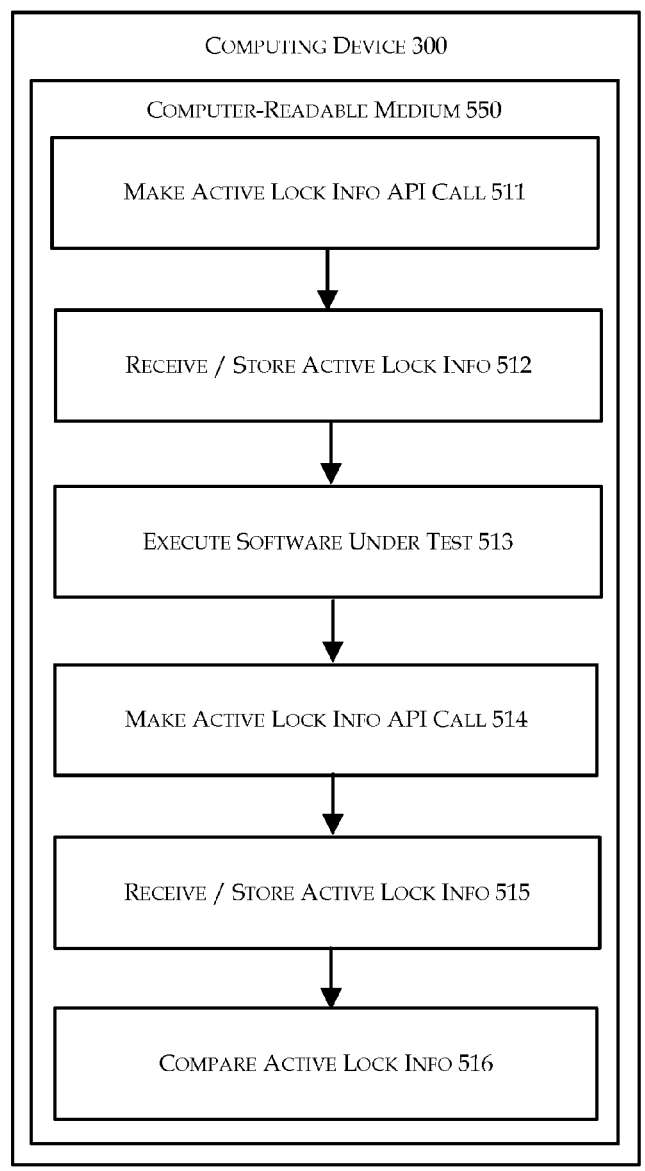
FIG. 5 is a flow diagram illustrating an example method configured to test software, all arranged in accordance with at least some embodiments of the present disclosure.

FIG. 5 is a flow diagram illustrating an example method configured to test software, arranged in accordance with at least some embodiments of the present disclosure. The example flow diagram may include one or more operations/modules as illustrated by blocks 511-516, which represent operations as may be performed in a method, functional modules in a computing device 300, and/or instructions as may be recorded on a computer readable medium 550. The illustrated blocks 511-516 may be arranged to provide functional operations of "Make Active Lock Info API Call" at block 511, "Receive/Store Active Lock Info" at block 512, "Execute Software Under Test" at block 513, "Make Active Lock Info API Call" at block 514, "Receive/Store Active Lock Info" at block 515, and/or "Compare Active Lock Info" at block 516.

In FIG. 5, blocks 511-516 are illustrated as including blocks being performed sequentially, e.g., with block 511 first and block 516 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 5 illustrates an example method by which a software testing system, e.g., application 133 in computing device 300 may test software using an active lock information system such as disclosed herein. The software testing system on computing device 300 may generally make active lock information requests before and after executing software under test, and compare received active lock information to identify bugs and/or establish correct desired operation of software under test. Software under test may comprise any software. In some examples, software under test may comprise a database driver and/or any software that performs database transactions, which transactions may be atomic in some circumstances.

In a "Make Active Lock Info API Call" block 511, software testing system module(s) in computing device 300 may make a first active lock information request, e.g., a first API call, to an active lock information system such as described herein.

The first active lock information request may be configured to request any active lock information, e.g., all active locks held by software under test, or any active locks on a particular resource used by software under test. Block 511 may be followed by block 512.

In a "Receive/Store Active Lock Info" block 512, software testing system module(s) in computing device 300 may receive and store first requested active lock information provided by the active lock information system in response to the first active lock information request. The first requested active lock information may include, for example, lock IDs and corresponding lock access IDs at the time of the first request. Block 512 may be followed by block 513.

In an "Execute Software Under Test" block 513, software testing system module(s) in computing device 300 may cause software under test, or a segment thereof, to execute on computing device. For example, software testing system module(s) may initiate execution of one or more portions of software under test known to use locks on resources to perform one or more atomic transactions. Software testing system module(s) may also cause simultaneous execution of any other software, or cause computing device 300 to perform one or more operations, to test cooperation between the software under test and such other software/operations. Block 513 may be followed by block 514.

In a "Make Active Lock Info API Call" block 514, software testing system module(s) in computing device 300 may make a subsequent active lock information request, e.g., a subsequent API call, to the active lock information system. The subsequent request may be configured to request, for example, same active lock information as the first active lock information request. The software testing system module(s) may make the subsequent active lock information request in response to completion of execution of software under test. Block 514 may be followed by block 515.

In a "Receive/Store Active Lock Info" block 515, software testing system module(s) in computing device 300 may receive and store subsequent requested active lock information provided by the active lock information API in response to the subsequent active lock information request. The subsequent requested active lock information may include, for example, lock IDs and corresponding lock access IDs at the time of the subsequent active lock information request. Block 515 may be followed by block 516.

In a "Compare Active Lock Info" block 516, software testing system module(s) in computing device 300 may compare the first requested active lock information and the subsequent requested active lock information to determine whether same lock IDs are associated with different lock access IDs in the first and the subsequent requested active lock information. If the lock access IDs are different than expected, for example, if software under test was expected to hold a lock for the duration of its execution, but lock access IDs are other than identical, then it may be inferred that the computing device 300 is not operating as expected when the software under test executes. Conversely, when the lock access IDs are as expected, it may be inferred that the computing device 300 is operating as expected when the software under test executes.

In some embodiments, comparing the first active lock information and the subsequent active lock information may be performed to verify that locks placed during execution of the software under test are placed according to a desired synchronization protocol. For example, the desired synchronization protocol may theoretically be expected to yield certain expected differences between lock access IDs in the first and the subsequent requested active lock information, and comparing the first active lock information and the subsequent active lock information may be performed to verify the expected differences. In some embodiments, comparing the first active lock information and the subsequent active lock information may be performed to ensure atomicity of a sequence of accesses to one or more of resources. For example, atomicity of the sequence of accesses may be expected to yield certain expected differences between lock access IDs in the first and the subsequent requested active lock information, and comparing the first active lock information and the subsequent active lock information may be performed to verify the expected differences.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method to provide active lock information by a computing device, comprising:
   maintaining, by an active lock information system at the computing device, active lock information by performing operations including:
      activating lock identifiers in the active lock information in response to placing, by threads managed by the computing device, locks on resources accessible by the computing device, wherein the lock identifiers identify the resources that are locked;
      deactivating lock identifiers in the active lock information in response to releasing, by the threads managed by the computing device, the locks on the resources; and modifying lock access identifiers in the active lock information, wherein each of the lock identifiers in the active lock information has an associated lock access identifier, wherein the lock access identifiers comprise lock version numbers that are incremented for each lock instance, and wherein a lock instance includes a lock release and re-acquisition;

receiving, by an active lock information Application Programming Interface (API) at the active lock information system, an active lock information API call from a thread, the active lock information API call comprising an active lock information request for at least a portion of the active lock information; and providing, by the active lock information API at the active lock information system, in response to the active lock information API call comprising the active lock information request, the requested portion of the active lock information comprising at least active lock identifiers and corresponding lock access identifiers for the requested portion of the active lock information.

2. The method of claim 1, wherein maintaining the active lock information further comprises inserting, in the active lock information, lock owner identifiers corresponding to the threads managed by the computing device that place the locks on the resources, wherein the lock owner identifiers comprise one or more of thread identifiers, process identifiers, or time identifiers.

3. The method of claim 2, wherein the requested portion of the active lock information comprises all active locks placed by the thread that generated the active lock information API call, and wherein the requested portion of the active lock information provided in response to the active lock information API call comprises lock identifiers and lock access identifiers of all active locks associated with the lock owner identifier for the thread that generated the active lock information API call.

4. The method of claim 2, wherein providing the requested portion of the active lock information comprises:
detecting the thread that generated the active lock information API call; and
using a lock owner identifier for the thread that generated the active lock information API call to exclude, from the requested portion of the active lock information, active lock information associated with lock owner identifiers other than the lock owner identifier for the thread that generated the active lock information API call.

5. The method of claim 2, wherein the active lock information system is configured to provide, to threads making active lock information API calls, only active lock information having same lock owner identifiers as the threads making the active lock information API calls.

6. The method of claim 1, wherein the method is performed at an operating system or at a runtime environment that is configured to provide a same runtime environment within the computing device as within other computing devices comprising the runtime environment and different device hardware.

7. The method of claim 1, wherein the method is performed at an operating system configured to support software testing by including at least the active lock information system.

8. A computing device configured to provide active lock information, comprising:
a processor;
a memory; and
an active lock information system stored in the memory and executable by the processor, wherein the active lock information system is configured to:
maintain active lock information by performing operations including:
activating lock identifiers in the active lock information in response to placing, by threads managed by the computing device, locks on resources accessible by the computing device, wherein the lock identifiers identify the resources that are locked;
deactivating lock identifiers in the active lock information in response to releasing, by the threads managed by the computing device, the locks on the resources; and
modifying lock access identifiers in the active lock information, wherein each of the lock identifiers in the active lock information has an associated lock access identifier, wherein the lock access identifiers comprise lock version numbers that are incremented for each lock instance, and wherein a lock instance includes a lock release and re-acquisition;
receive, by an active lock information Application Programming Interface (API) at the active lock information system, an active lock information API call from a thread, the active lock information API call comprising an active lock information request for at least a portion of the active lock information; and
provide, by the active lock information API at the active lock information system, in response to the active lock information API call comprising the active lock information request, the requested portion of the active lock information comprising at least active lock identifiers and corresponding lock access identifiers for the requested portion of the active lock information.

9. A non-transitory computer readable storage medium having computer executable instructions executable by a processor, the instructions that, when executed by the processor, implement an active lock information system which causes the processor to:
maintain active lock information by performing operations including:
activating lock identifiers in the maintained active lock information in response to placing, by threads managed by the computing device comprising the processor, locks on resources accessible by the processor, wherein the lock identifiers identify the resources that are locked;
deactivating lock identifiers in the maintained active lock information in response to releasing, by the threads managed by the computing device, the locks on the resources; and
modifying lock access identifiers in the active lock information, wherein each of the lock identifiers in the active lock information has an associated lock access identifier, wherein the lock access identifiers comprise lock version numbers that are incremented for each lock instance, and wherein a lock instance includes a lock release and re-acquisition;
receive, by an active lock information Application Programming Interface (API) at the active lock information system, an active lock information API call from a thread, the active lock information API call comprising an active lock information request for at least a portion of the active lock information; and
provide, by the active lock information API at the active lock information system, in response to the active lock information API call comprising the active lock information request, the requested portion of the active lock information comprising at least active lock identifiers and corresponding lock access identifiers for the requested portion of the active lock information.

10. The non-transitory computer readable storage medium of claim 9, wherein the instructions implementing the active lock information system are included within instructions implementing an operating system or a runtime environment that is configured to provide a same runtime environment within the computing device as within other computing devices comprising the runtime environment and different device hardware.

11. The non-transitory computer readable storage medium of claim 9, wherein the instructions implementing the active lock information system are included within an operating system that is configured to support software testing by including at least the active lock information system.

12. A method to provide active lock information by a computing device, comprising:
   maintaining, by an active lock information system at the computing device, an active lock information data structure by performing operations including:
      activating lock identifiers in the active lock information data structure in response to placing, by threads managed by the computing device, locks on resources accessible by the computing device, wherein the lock identifiers identify the resources that are locked;
      inserting, in the active lock information data structure, lock owner identifiers for each of the locks on the resources, wherein the lock owner identifiers identify the threads managed by the computing device that place the locks on the resources;
      deactivating lock identifiers in the active lock information data structure in response to releasing, by the threads managed by the computing device, the lock on the resources; and
      modifying lock access identifiers in the active lock information data structure, wherein the lock access identifiers are incremented for each lock instance, and wherein a lock instance includes a lock release and re-acquisition; and
   receiving, by an active lock information Application Programming Interface (API) at the active lock information system, an active lock information request for at least a portion of the active lock information data structure; and
   providing, by the active lock information API at the active lock information system, in response to the active lock information API call comprising the active lock information request, the requested portion of the active lock information from the active lock information data structure, the requested portion of the active lock information comprising at least active lock identifiers and corresponding lock owner identifiers for the requested portion of the active lock information, excluding active lock information associated with lock owner identifiers other than the lock owner identifier for the thread that generated the active lock information API call.

13. The method of claim 12, wherein the lock access identifiers comprise lock version numbers that are incremented for each lock instance.

14. A non-transitory computer readable storage medium having computer executable instructions executable by a processor, the instructions that, when executed by the processor, implement an active lock information system which causes the processor to:
   maintain an active lock information data structure by performing operations including:
      activating lock identifiers in the active lock information data structure in response to placing, by threads managed by a computing device comprising the processor, locks on resources accessible by the processor, wherein the lock identifiers identify the resources that are locked;
      inserting, in the active lock information data structure, lock owner identifiers for each of the locks on the resources, wherein the lock owner identifiers identify the threads managed by the computing device that place the locks on the resources;
      deactivating lock identifiers in the active lock information data structure in response to releasing, by the threads managed by the computing device, the lock on the resources; and
      modifying lock access identifiers in the active lock information data structure, wherein the lock access identifiers are incremented for each lock instance, and wherein a lock instance includes a lock release and re-acquisition; and
   receive, by an active lock information Application Programming Interface (API) at the active lock information system, an active lock information request for at least a portion of the active lock information data structure; and
   provide, by the active lock information API at the active lock information system, in response to the active lock information API call comprising the active lock information request, the requested portion of the active lock information from the active lock information data structure, the requested portion of the active lock information comprising at least active lock identifiers and corresponding lock owner identifiers for the requested portion of the active lock information, excluding active lock information associated with lock owner identifiers other than the lock owner identifier for the thread that generated the active lock information API call.

15. The non-transitory computer readable storage medium of claim 14, wherein the lock access identifiers comprise lock version numbers that are incremented for each lock instance.

* * * * *

UNITED STATES PATENT AND TRADEMARK OFFICE
CERTIFICATE OF CORRECTION

| | | |
|---|---|---|
| PATENT NO. | : 9,207,996 B2 | Page 1 of 1 |
| APPLICATION NO. | : 13/813209 | |
| DATED | : December 8, 2015 | |
| INVENTOR(S) | : Ur | |

It is certified that error appears in the above-identified patent and that said Letters Patent is hereby corrected as shown below:

In the Specification

In Column 1, Line 5, delete "APPLICATIONS APPLICATION" and insert -- APPLICATION --, therefor.

In Column 1, Line 8, delete "371" and insert -- § 371 --, therefor.

In Column 2, Line 52, delete "all arranged in accordance with at least some embodiments of the present disclosure." and insert the same at Line 54, as a new subpoint.

In the Claims

In Column 23, Line 33, in Claim 12, delete "lock" and insert -- locks --, therefor.

In Column 24, Line 27, in Claim 14, delete "lock" and insert -- locks --, therefor.

Signed and Sealed this
Twenty-sixth Day of April, 2016

Michelle K. Lee
*Director of the United States Patent and Trademark Office*